Patented Mar. 29, 1932

1,851,312

UNITED STATES PATENT OFFICE

WILBERT J. HUFF, OF BALTIMORE, MARYLAND

PROCESS OF PURIFYING GAS

No Drawing.   Application filed May 24, 1929. Serial No. 365,791.

This invention relates to a process of purifying gas and particularly to a process for the removal of sulfur compounds from combustible gas.

In processes for the removal of sulfur compounds from gas by the passage of the heated gas over an absorbent or catalytic material in which oxygen is present, there may be formed a small quantity of sulfur dioxide. A specific example of such a process is described in the copending application of Huff, Logan and Lusby, Ser. No. 250,331, filed Jan. 28, 1928. The process therein described consists, briefly, in alternately passing the gas over an absorbent material comprising a mixture of metals, or metallic oxides, preferably a mixture of copper oxide and an oxide of a metal of one of the fifth and sixth groups of the periodic system, and subjecting the material to the action of air, or other oxygen-containing gas, to maintain its activity, the process being carried out at elevated temperatures, in excess of 200° C. When the oxygen-containing gas, for example, air, is passed over the metallic material in the presence of sulfur, the sulfur is burned and the greater part of it is usually carried away in the oxygen-containing gas stream. When this gas stream is of little value, as for example, air, the presence of the oxides of sulfur possesses no disadvantage, but if the gas stream is of value and is retained and handled in the usual metallic equipment, the oxides of sulfur may prove a cause of corrosion. Moreover a portion of the oxides of sulfur may be retained in the metallic absorbent and when the oxygen-containing gas stream is discontinued and the sulfur-containing gas to be purified is again admitted to the purifying chamber, a portion of the retained oxides of sulfur may be liberated and go forward with the purified gas stream. When the concentrations of the sulfur dioxide in the gas stream are very small the matter may be of no great importance. Under other circumstances, however, the quantity may be large. Moreover under many conditions it may be desirable to remove completely all traces of these oxides.

I have found that this can be done economically by so modifying the process, referred to, of purifying gas that a small quantity of hydrogen sulfide remains after the gas passes through the hot purifying chamber. This gas stream, containing a small quantity of hydrogen sulfide and sulfur dioxide, is caused to pass over suitably humidified hydrated iron oxide. Here the hydrogen sulfide is removed to form ferric sulfide which in turn reacts with the sulfur dioxide to form free sulfur and hydrated iron oxide. In order that this reaction may proceed at a high rate at ordinary temperatures, I have found it necesssary to keep the iron oxide moist by maintaining a high humidity in the gas stream as it passes over the iron oxide. Iron oxide alone, even when moist, is not a satisfactory absorbent for small quantities of sulfur dioxide in the gas stream. Care must be taken to so adjust the conditions that an excess of hydrogen sulfide is present, the amount of sulfide being determined by the equation:

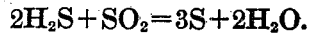
$$2H_2S + SO_2 = 3S + 2H_2O.$$

This can be done either by suitably adjusting the conditions under which the hot purification process is carried out so as to cause the gas to carry a slight excess of hydrogen sulfide or a suitable quantity of unpurified hydrogen sulfide-containing gas may be mixed with the sulfur dioxide-containing gas, or the iron may be sulfided discontinuously if desired. In order to avoid complete fouling of the iron oxide when hydrogen sulfide is admitted continuously with consequent passing of hydrogen sulfide, a small quantity of oxygen is passed over the oxide.

The following example will illustrate conditions under which may invention may be carried out. Carburetted water gas containing 150 grains of hydrogen sulfide is treated by the process described in the application, referred to above, under such space velocities and temperatures that the exit gas contains 45 grains of hydrogen sulfide and 20 grains of sulfur dioxide. The hot gas is cooled to 90° F. at which temperature it is saturated with water vapor. The cooled saturated gas is then passed over hydrated iron oxide at this temperature at a space velocity of 300 per hour, whereby complete elimination of the sulfur dioxide and hydrogen sulfide is effected. To insure that the iron oxide does not become completely fouled a small quantity of air is added to the gas just before it passes over the iron oxide. The amount of oxygen is, however, maintained low—not over .6 of 1%.

While I have described my process using iron oxide, which is generally the most convenient and economic material, I have found that the process may also be carried out by the use of other metallic oxides, such as hydrated manganese dioxide and other oxides belonging to metals of the fifth to the eighth group, inclusive, fourth series of the periodic table of Mendelejeff as set forth on pages 474–475—Handbook of Chemical Rubber Company, 13th edition, or other suitable porous materials possessing the ability to induce the desired chemical reactions at low temperatures upon their surfaces.

Obviously my process is not directed alone toward the removal of sulfur dioxide from the gases obtained in a hot purification process such as described in the application of Huff, Logan and Lusby, referred to above, but is applicable wherever it is desired to remove sulfur dioxide from a gas stream.

From the foregoing it will be readily understood that the use of the process described in the copending application of Huff, Logan and Lusby, in conjunction with a low temperature sulfur removal agent possesses a number of advantages when the gas from the hot step contains sulfur dioxide. I have found it advantageous to use this combination of high temperature and low temperature processes even when no sulfur dioxide is contained in this gas. Thus the use of the low temperature step permits an important reduction to be made in the size of the high temperature apparatus and this is valuable where space conditions impose restrictions upon the size of the apparatus which can be attached to the gas making machine. The use of the combination process also possesses an advantage in that the operation does not require close supervision. Thus the temporarily incomplete removal of the hydrogen sulfide in the first step is cared for in the second.

Now having fully described my invention, what I claim as new and desire to secure by Letters Patent of the United States is:

1. A process for removing sulfur compounds from gas, which consists of converting a portion of the sulfur compounds to sulfur dioxide and causing the sulfur dioxide to react with unchanged hydrogen sulfide upon humidified surfaces containing insoluble sulfide sulfur, at temperatures below 100° C., said surfaces being formed by interactions involving metallic oxide hydrates and hydrogen sulfide.

2. A process for removing sulfur dioxide from a gas stream at temperatures below 100° C., which consists in passing the gas stream over a moist sulfided oxide hydrate of a metal belonging to the fifth to eighth group, inclusive, fourth series of the periodic table.

3. A process for removing hydrogen sulfide and sulfur dioxide simultaneously from a gas stream, which consists in passing the gas stream at temperatures below 100° C. over a moist hydrated oxide of a metal belonging to the fifth to eighth group, inclusive, fourth series of the periodic table.

4. A process for removing hydrogen sulfide and sulfur dioxide simultaneously from a gas stream, which consists in passing the gas stream at temperatures below 100° C. over a moist hydrated oxide of a metal belonging to the fifth to eighth group, inclusive, fourth series of the periodic table, in the presence of oxygen.

5. A process for removing sulfur dioxide from a gas stream, which consists in passing the gas stream at temperatures below 100° C. over moist sulfided iron oxide hydrate.

6. A process of removing hydrogen sulfide and sulfur dioxide simultaneously from a gas stream, which consists in passing the gas stream at temperatures below 100° C. over moist hydrated iron oxide in the presence of oxygen.

7. A process of removing hydrogen sulfide and sulfur dioxide simultaneously from a gas stream, which consists in passing the gas stream over moist hydrated iron oxide at temperatures below 100° C.

8. A process for removing sulfur compounds from gas, which consists in passing the gas over a sulfur binding material which is treated with oxygen whereby a portion of the sulfur compounds is removed, another portion is converted into sulfur dioxide and the third portion passes unchanged, cooling the gas and passing it over humidified surfaces capable of forming insoluble sulfides, at temperatures below 100° C., said surfaces consisting originally of metallic oxide hydrates whereby sulfur dioxide and hydrogen sulfide are removed from the gas stream, and the humidified surfaces serve to take up fluctuations in the hydrogen-sulfide removing operations in the hot stage of the process.

9. The process of treating combustible gas, comprising alternately passing the combustible gas over a sulfur binding material at an elevated temperature to remove a portion of the sulfur compounds, cooling the combustible gas and passing it at temperatures below 100° C. over the moist hydrated oxide of a metal belonging to the fifth to eighth group, inclusive, fourth series of the periodic table, whereby a more complete removal of the sulfur compounds is effected.

10. The process of treating combustible gas, comprising alternately passing the combustible gas over a sulfur binding material at an elevated temperature to remove a portion of the sulfur compounds, subjecting the said material to the action of a gas containing oxygen for the purpose of maintaining its activity and producing sulfur-dioxide, cooling the combustible gas and passing it with a portion of the sulfur dioxide so produced over moist hydrated iron oxide at temperatures below 100° C. whereby the removal of sulfur compounds is effected.

11. The process for treating gas, comprising passing the gas over a sulfur binding material consisting originally of copper oxide and an oxide of a metal of one of the fifth and sixth groups of the periodic system at an elevated temperature to remove a portion of the sulfur compounds, cooling the gas and passing it at temperatures below 100° C. over the moist hydrated oxide of a metal belonging to the fifth to eighth group, inclusive, fourth series of the periodic table, whereby removal of the sulfur compounds is effected.

12. The process of treating a gas comprising alternately passing combustible gas over a sulfur binding material consisting originally of copper oxide and an oxide of a metal of one of the fifth and sixth groups of the periodic system at an elevated temperature to remove a portion of the sulfur compounds, subjecting the said material to the action of a gas containing oxygen for the purpose of maintaining its activity and producing sulfur dioxide, cooling the combustible gas and passing it at temperatures below 100° C. over moist hydrated iron oxide whereby removal of sulfur compounds is effected with a portion of the sulfur dioxide and the moist hydrated iron oxide serves to take up part of the fluctuations in the removal of sulfur compounds in the hot stage of the process.

13. A process for the removal of hydrogen sulfide and sulfur dioxide from gas which consists in passing the gases containing these materials over a humidified oxide hydrate of a metal belonging to the seventh to eighth group, fourth series, of the periodic system.

14. A process for the removal of hydrogen sulfide and sulfur dioxide which consists in passing gases containing these materials over humidified manganese oxide hydrate.

15. A process for the removal of sulfur dioxide from gas which consists in passing gas containing this material over a humidified sulfided oxide hydrate of a metal belonging to the seventh to eighth group, fourth series, of the periodic system.

16. A process for the removal of sulfur dioxide from gas which consists in passing gases containing this material over humidified sulfided manganese oxide hydrate.

In testimony whereof I hereunto affix my signature.

WILBERT J. HUFF.